(12) United States Patent
Inoue

(10) Patent No.: US 8,908,841 B2
(45) Date of Patent: Dec. 9, 2014

(54) COMMUNICATION APPARATUS CAPABLE OF PERFORMING FACSIMILE COMMUNICATION, AND CONTROL METHOD AND STORAGE MEDIUM THEREFOR

(75) Inventor: Katsuhiro Inoue, Kawasaki (JP)

(73) Assignee: Canon Kabushiki Kaisha (JP)

( * ) Notice: Subject to any disclaimer, the term of this patent is extended or adjusted under 35 U.S.C. 154(b) by 251 days.

(21) Appl. No.: 13/547,480

(22) Filed: Jul. 12, 2012

(65) Prior Publication Data

US 2013/0051541 A1 Feb. 28, 2013

(30) Foreign Application Priority Data

Aug. 24, 2011 (JP) ................... 2011-182652

(51) Int. Cl.
| | | |
|---|---|---|
| *H04M 11/00* | (2006.01) | |
| *H04N 1/00* | (2006.01) | |
| *H04M 11/06* | (2006.01) | |
| *H04N 1/333* | (2006.01) | |

(52) U.S. Cl.
CPC ......... *H04N 1/0022* (2013.01); *H04N 1/00217* (2013.01); *H04M 11/066* (2013.01); *H04N 1/33369* (2013.01); *H04N 1/33346* (2013.01); *H04N 2201/33364* (2013.01); *H04N 1/33323* (2013.01)
USPC ................. 379/100.16; 379/100.15

(58) Field of Classification Search
CPC .......... H04N 1/00209; H04N 1/00214; H04N 1/0022; H04N 1/32765; H04N 2201/0015; H04N 2201/3209; H04N 2201/3274; H04N 1/33338; H04N 1/33369; H04N 1/33376; H04N 1/32721; H04N 1/33307; H04N 1/32708; H04N 1/33323; H04M 2201/52; H04M 2203/657; H04M 11/066
USPC .................. 379/100.01–100.16; 358/440
See application file for complete search history.

(56) References Cited

U.S. PATENT DOCUMENTS 7,453,606 B2 * 11/2008 Maeda ........................ 358/438
2004/0184110 A1 9/2004 Maei et al.

FOREIGN PATENT DOCUMENTS

JP 2003-309701 A 10/2003

\* cited by examiner

*Primary Examiner* — Stella Woo
(74) *Attorney, Agent, or Firm* — Rossi, Kimms & McDowell LLP (57) ABSTRACT

A communication apparatus capable of executing facsimile transmission in any of real-time Internet mode and VoIP-based virtual voice mode and capable of switching voice communication to facsimile communication of the real-time Internet mode which is higher in communication speed than the virtual voice mode. In a case where voice communication is switched to facsimile communication, the facsimile transmission is executed in T.38 mode, if it is determined based on destination information stored in a storage unit of the communication apparatus that a communication destination with which the voice communication is being performed is capable of performing facsimile communication in T.38 mode.

9 Claims, 5 Drawing Sheets

| 401 | 402 | 403 | 404 | 405 | 406 |
|---|---|---|---|---|---|
| ACCEPTANCE NUMBER | DESTINATION INFORMATION | COMMUNICATION MODE | NUMBER OF PAGES | COMMUNICATION TIME | COMMUNICATION RESULT |
| 0001 | 050XXXXXXXX | IPFAX ( T.38 ) | 3 | 00'22 | OK |
| 0002 | 050△△△△△△△ | G3FAX | 3 | 01'02 | NG |

| ACCEPTANCE NUMBER 401 | DESTINATION INFORMATION 402 | COMMUNICATION MODE 403 | NUMBER OF PAGES 404 | COMMUNICATION TIME 405 | COMMUNICATION RESULT 406 |
|---|---|---|---|---|---|
| 0001 | 050XXXXXXXX | IPFAX (T.38) | 3 | 00'22 | OK |
| 0002 | 050△△△△△△△△ | G3FAX | 3 | 01'02 | NG |

COMMUNICATION APPARATUS CAPABLE OF PERFORMING FACSIMILE COMMUNICATION, AND CONTROL METHOD AND STORAGE MEDIUM THEREFOR

BACKGROUND OF THE INVENTION

1. Field of the Invention

The present invention relates to a communication apparatus and a control method and a storage medium therefor, and more particularly, to a communication apparatus capable of performing real-time Internet facsimile communication and VoIP-based virtual voice mode facsimile communication, and a control method and a storage medium therefor.

2. Description of the Related Art

An Internet facsimile apparatus configured to be connected to IP network for execution of facsimile communication on the Internet is spreading in recent years. As a mode to realize facsimile communication via IP network, there can be mentioned a mode of ITU-T recommendation T.38 in which a facsimile signal is transferred in real-time through IFP (Internet Facsimile Protocol) packets.

In the T.38 mode, a session connection is established, peer to peer, using a SIP technique. SIP (Session Initiation Protocol) is a protocol that establishes, changes, and disconnects a session in which voice, image, text message, or the like is exchanged in application layer.

To start such a session, a facsimile apparatus exchanges information that specifies session's media type (audio, video, application, or image) with a destination apparatus. For example, a media type of audio is specified in the information to perform voice communication, whereas a media type of image or application is specified to perform communication in T.38 mode.

IP telephone, which is based on VoIP (Voice over Internet Protocol) technology for transmitting and receiving voice data in real-time on the Internet, is spreading as a service using Internet line.

Also, virtual voice mode facsimile communication based on VoIP technology comes into practical use, in which a facsimile signal is regarded as a voice signal and communicated in real-time on the Internet.

For example, a facsimile apparatus capable of executing virtual voice mode facsimile communication and T.38 mode facsimile communication on IP network is disclosed in e.g. Japanese Laid-open Patent Publication No. 2003-309701.

It should be noted that with a facsimile apparatus having a telephone function, manual transmission has heretofore been executed, in which telephone communication is switched to facsimile communication after completion of the telephone communication. However, virtual voice mode facsimile communication and T.38 mode facsimile communication are generally performed independently of each other, but are not performed in concert with each other.

As previously described, a call connection is established in a session for which a media type of voice (m=audio) is specified. At that time, it is preferable to perform communication in the T.38 mode while specifying a media type of image or application, if a destination apparatus has a T.38 communication capability. However, there is no way to determine whether the destination apparatus has a T.38 communication capability.

Accordingly, in a case that facsimile transmission is performed from a state where a connection has been established in a voice session, telephone communication is switched to virtual voice communication capable of executing facsimile transmission, with the media type of voice (m=audio) kept specified. The communication speed in facsimile communication performed in virtual voice communication mode is 33.6 kbps at maximum, which is extremely low as compared to that in T.38 communication mode.

SUMMARY OF THE INVENTION

The present invention provides a communication apparatus capable of executing facsimile transmission in any of real-time Internet mode and VoIP-based virtual voice mode and capable of switching voice communication to facsimile communication of the real-time Internet mode which is higher in communication speed than the virtual voice mode, and provides a control method and a storage medium for the communication apparatus.

According to one aspect of this invention, there is provided a communication apparatus capable of performing real-time Internet facsimile communication and VoIP-based virtual voice mode facsimile communication, which comprises a storage unit configured to store at least one piece of destination information each representing whether a corresponding one of at least one pre-registered communication destination is capable of performing the real-time Internet facsimile communication, a voice communication unit configured to perform voice communication with a communication destination, and a transmission unit configured, in a case where voice communication by the voice communication unit is switched to facsimile communication, to perform the real-time Internet facsimile communication to transmit image data, if it is determined based on a corresponding piece of the destination information stored in the storage unit that a destination of the voice communication which is being performed is capable of performing the real-time Internet facsimile communication.

According to this invention, in a communication apparatus capable of executing facsimile transmission in any of real-time Internet mode (such as T.38 mode) and VoIP-based virtual voice mode, voice communication can be switched to facsimile communication of the real-time Internet mode (e.g., T.38 mode), which is higher in communication speed than the virtual voice mode.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
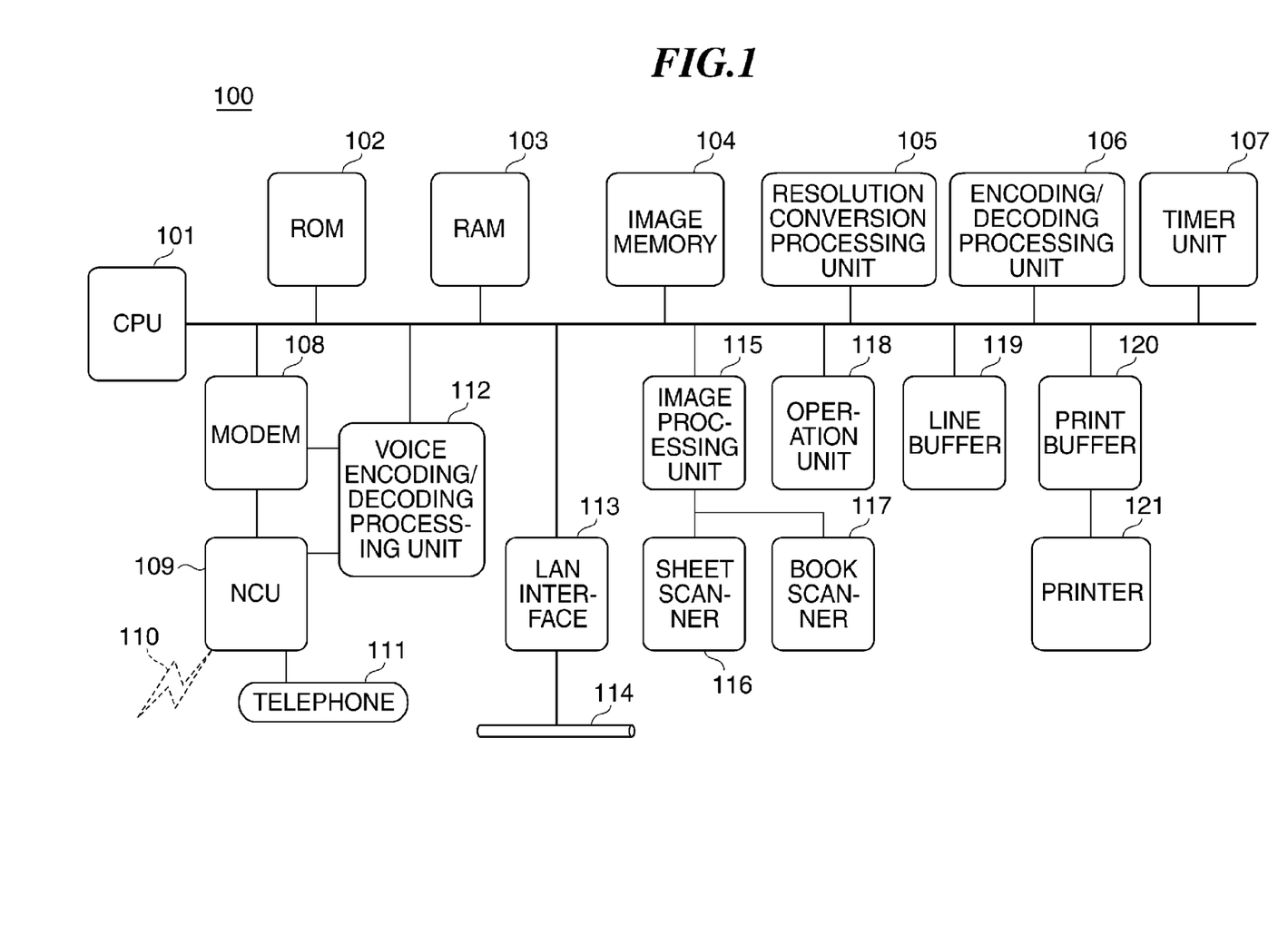
FIG. 1 is a block diagram schematically showing the construction of a communication apparatus according to one embodiment of this invention.

FIG. 1 schematically shows the construction of a communication apparatus 100 according to one embodiment of this invention.

In FIG. 1, there is shown a CPU 101 (system controller) that overall controls the communication apparatus 100. A ROM 102 stores a control program for execution by the CPU 101, a RAM 103 constituted by a SRAM or the like stores image data, and an image memory 104 constituted by a DRAM or the like stores image data.

A resolution conversion processing unit 105 performs resolution conversion such as millimeter-to-inch resolution conversion of raster data. An encoding/decoding processing unit (reading/recording codec) 106 performs encoding/decoding processing on image data handled by the communication apparatus 100. A timer unit 107 is constituted by an IC or the like and measures an operation interval, etc.

A modem 108 demodulates a modulated signal supplied from a line and modulates a signal supplied from the communication apparatus 100 for output to the line. An NCU (network control unit) 109 is an I/F unit with a PSTN (public switched telephone network) 110, which is an analog line.

A telephone 111 includes a handset used for telephone communication, and has an answering machine function or the like. A voice encoding/decoding processing unit 112 that supports voice encoding systems such as G.711 and G.729 encodes voice and decodes an encoded voice signal.

A LAN interface 113 is constituted by a NIC (network interface controller) or the like and performs network-related control. A LAN 114 is constituted by an in-house IP, a NGN (next generation network), or the like.

An image processing unit 115 performs correction processing on image data read by a sheet scanner 116 or by a book scanner 117, and outputs the processed image data of high-resolution quality.

The sheet scanner 116 and the book scanner 117 each include a CS image sensor, an original conveyance mechanism, and the like. Each of the scanners 116, 117 optically reads an original image and converts the read image into image data. These scanners are capable of performing double-sided reading.

An operation unit 118 includes a keyboard, a display unit, etc., and is used by a user for input operation. When the handset is off-hooked, the display unit displays that an immediate dial operation can be performed. When an external telephone is off-hooked, the display unit displays that communication is being performed and that communication reservation can be accepted.

A line buffer 119 is used to control transfer of image data. A print buffer 120 is a memory buffer for storing one page of character codes for print.

A printer 121 is e.g. a laser beam printer that records received image, file data, or the like on a normal sheet and is capable of double-sided recording.

Figure 2:
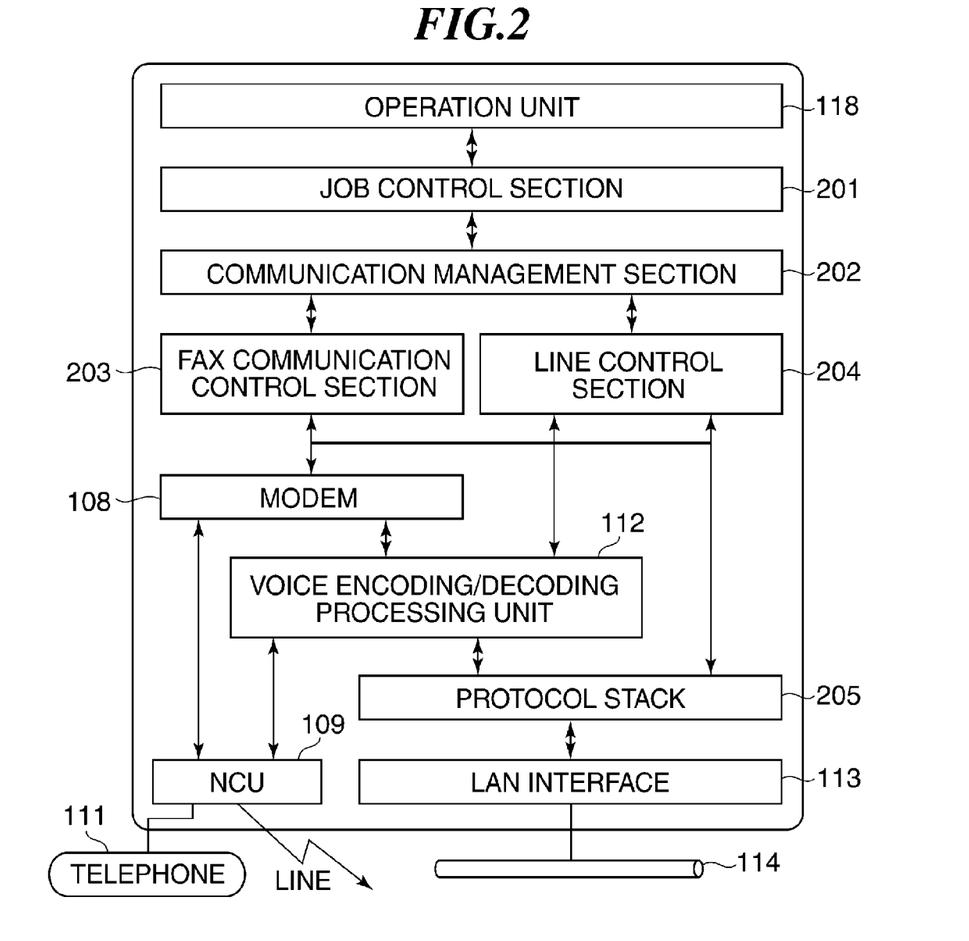
FIG. 2 is a block diagram schematically showing the software structure of the communication apparatus.

FIG. 2 schematically shows the software structure of the communication apparatus 100, together with several elements of the apparatus 100 which are previously described with reference to FIG. 1.

Based on the software structure shown in FIG. 2, communication is performed by a G3 facsimile application in either of virtual voice communication mode and T.38 mode.

In the case of G3 facsimile transmission, a FAX transmission job is created by a job control section 201 in response to a user's transmission operation on the operation unit 118, and the created job is notified to a communication management section 202.

In response to this notification, the communication management section 202 requests a line control section 204 to perform transmission processing. The line control section 204 sends a notification to request the modem 108 and the NCU 109 to transmit a dial signal.

When a dial signal is transmitted and a connection with a destination is established, the communication management section 202 starts a FAX communication control section 203 that performs T.30 protocol control for the modem 108 and the NCU 109, whereby G3 facsimile communication is performed.

In the case of virtual voice communication, when facsimile communication of virtual voice communication mode is selected on the operation unit 118, the job control section 201 creates an IP telephone-based transmission/telephone communication job and the created job is notified to the line control section 204 via the communication management section 202.

When receiving the notification that requests the execution of IP telephone-based transmission, the line control section 204 notifies a protocol stack 205 to establish a SIP connection with the destination. In response to this notification, the protocol stack 205 creates a SIP message and transmits it to the LAN 114 via the LAN interface 113.

When a SIP voice session with the destination is established, voice input from the telephone 111 is encoded by the voice encoding/decoding processing unit 112 and transmitted to the LAN 114 by RTP (Real-time Transport Protocol) of the protocol stack 205.

In response to a user's transmission start operation on the operation unit 118, the FAX communication control section 203 starts facsimile communication. A facsimile procedure signal and image data created through the modem 108 are encoded by the voice encoding/decoding processing unit 112 and transmitted by the RTP of the protocol stack 205 to the connection destination.

In the case of real-time Internet facsimile transmission, when e.g., IP network selection or SIP selection is made by the user on the operation unit 118 to select real-time Internet facsimile communication, a real-time Internet facsimile transmission job is created by the job control section 201 and the created job is notified to the communication management section 202. In response to this, the management section 202 notifies via the line control section 204 the protocol stack 205 to establish a SIP connection with the destination.

In response to this notification, the protocol stack 205 creates a SIP message and transmits it to the LAN 114 via the LAN interface 113.

When a SIP session with the destination is established, the communication management section 202 executes T.38-based real-time Internet facsimile procedures with the connection destination.

As described above, the communication apparatus 100 is capable of executing facsimile transmission in any of T.38 mode and VoIP-based virtual voice mode.

Figure 3:
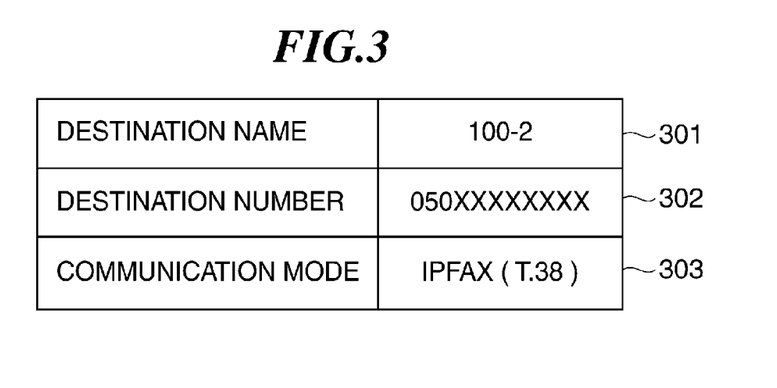
FIG. 3 is a view showing an example of a destination table used by the communication apparatus.

FIG. 3 shows an example of a destination table used by the communication apparatus 100.

As shown in FIG. 3, the destination table includes a destination name field 301, a destination number field 302, and a communication mode field 303.

The destination name field 301 is stored with information representing a name that identifies a destination. The destination number field 302 is stored with information representing a destination telephone number. The communication mode field 303 is stored with information representing one or more facsimile communication modes usable for facsimile communication with the destination. In this example, information representing at least one of IP FAX (T.38) mode and G3 FAX (virtual voice) mode is stored in the communication mode field 303.

Although the destination table of FIG. 3 includes only pieces of information for one destination, pieces of information for a plurality of destinations can be registered in the destination table. The destination table is stored in a flash memory or the like that constitutes the ROM 102 or stored in a hard disk drive (not shown), for example.

Figure 4:
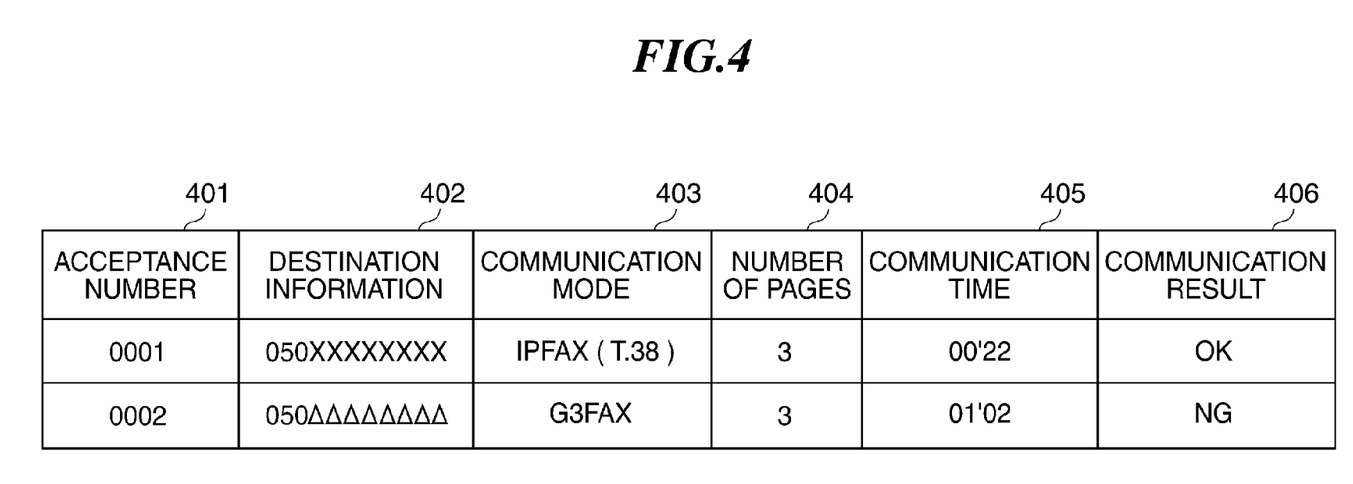
FIG. 4 is a view showing an example of a communication history table used by the communication apparatus.

FIG. 4 shows an example of a communication history table used by the communication apparatus 100.

Referring to FIG. 4, the communication history table stores history information that represents a history of communications performed in the past with destinations, and includes an acceptance number field 401, destination information field 402, communication mode field 403, number of pages field 404, communication time field 405, and communication result field 406.

The acceptance number field 401 is stored with pieces of information each representing an acceptance number assigned to a corresponding one of facsimile transmission jobs. The destination information field 402 is stored with pieces of information each representing a destination telephone number. The communication mode field 403 is stored with pieces of information each representing at least one communication mode used in the communication with the destination. In this example, each piece of information stored in the communication mode field 403 represents at least one of IPFAX (T.38) and G3 FAX (virtual voice).

The number of pages field 404 is stored with pieces of information each representing communication pages. The communication time field 405 is stored with pieces of information each representing an actual communication time. The communication result field 406 is stored with pieces of information each representing a result of facsimile communication (OK or NG).

The communication history table is stored in a flash memory or the like that constitutes the ROM 102 or stored in a hard disk drive (not shown), for example.

Information stored in the communication mode field 303 of the destination table of FIG. 3 and pieces of information stored in the communication mode field 403 of the communication history table of FIG. 4 are an example of at least one piece of destination information of this invention each representing whether a corresponding one of at least one pre-registered communication destination is capable of performing real-time Internet facsimile communication (e.g., facsimile communication in T.38 mode). The ROM 102 is an example of a storage unit of this invention that stores pieces of destination information.

Figure 5:
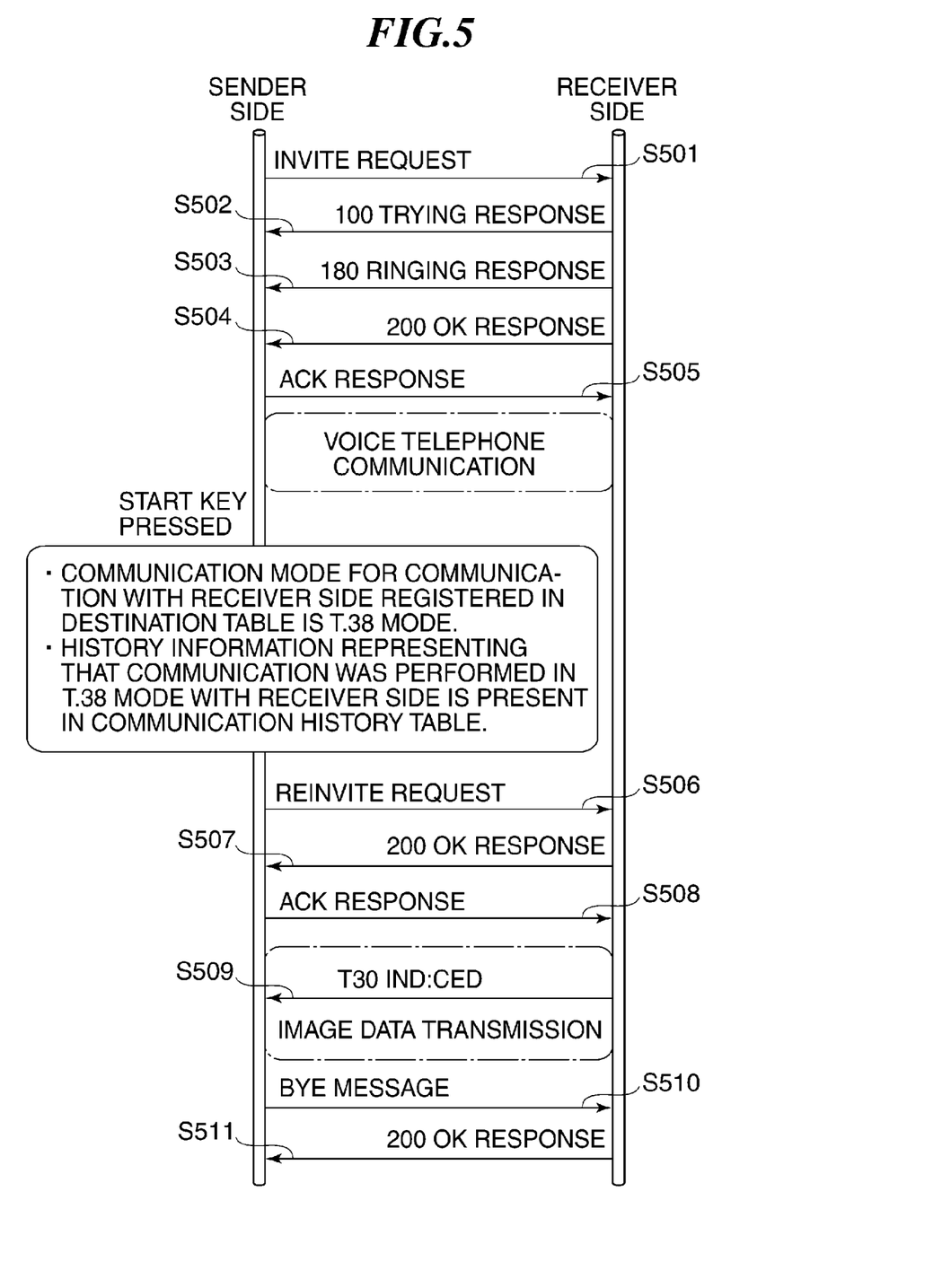
FIG. 5 is a sequence diagram showing procedures of communication performed between communication apparatuses on sender and receiver sides.

FIG. 5 shows, in sequence diagram, procedures of communication performed between the CPU 101 of the communication apparatus 100 on a sender side and that on a receiver side.

In FIG. 5, there are shown procedures of communication in which voice connection is established by off-hook dialing (i.e., by hooking up and dialing the telephone 111) and voice telephone communication is subsequently switched to T.38 communication.

An INVITE request (session establishment request), which includes information representing a media type (m) of audio, is transmitted from the sender side (step S501).

In response to the INVITE request, a "100 Trying" (in-process) response, a "180 Ringing" (during call) response, and a "200 OK" (success) response are sequentially transmitted from the receiver side (steps S502 to S504).

The receiver side receives an ACK (acknowledgement) response from the sender side (step S505) and creates an audio session, whereby a voice telephone communication state is established.

After completion of telephone communication, a transmission original is set and a start key is pressed by the operator to confirm a transmission operation.

It is assumed here that T.38 mode is registered in the destination table on the sender side as a communication mode usable for communication with the receiver side or that history information representing that communication was performed in T.38 mode with the receiver side is present in the communication history table on the sender side.

The sender side transmits a reINVITE request (session reestablishment request) that includes information representing a media type (m) of image (step S506), to thereby request the receiver side to create an image session.

In response to the reINVITE request, a "200 OK" (success) response is transmitted from the receiver side (step S507). In response to this, the sender side transmits an ACK response (step S508), whereby an image session is established and T.38 communication is started. Subsequently, a "T30 IND:CED" message relating to facsimile signal, and the like are transmitted (step S509), and image data transmission is executed by T.38 communication.

After completion of the image data transmission, the sender side transmits a BYE (disconnection) message (step S510), and the receiver side transmits a "200 OK" response (step S511), whereby T.38 communication in standard SIP connection sequence is completed.

Figure 6:
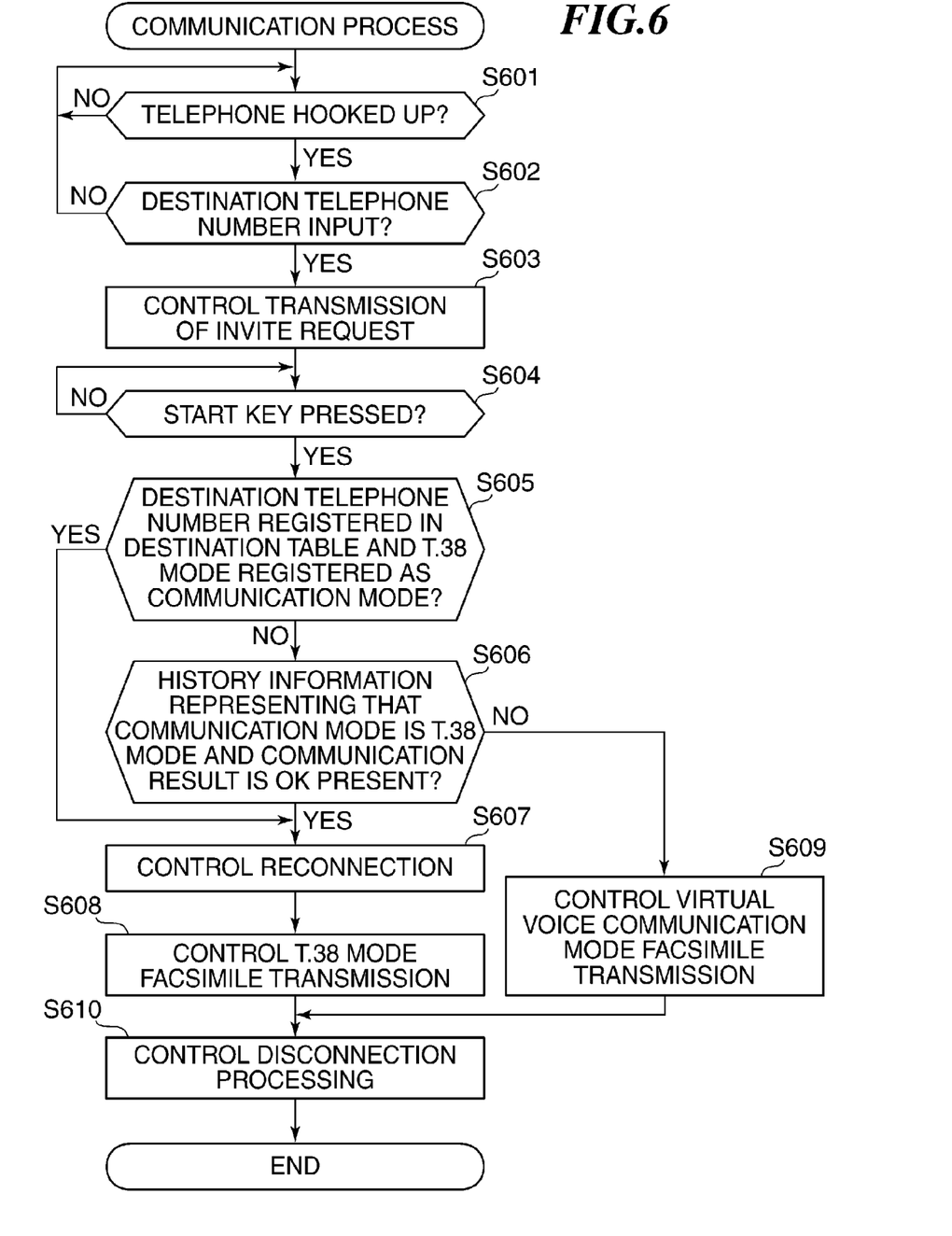
FIG. 6 is a flowchart showing the procedures of a communication process performed by the communication apparatus on the sender side.

FIG. 6 shows in flowchart the procedures of a communication process performed by the CPU 101 of the communication apparatus 100 on the sender side.

In FIG. 6, there is shown a communication process in which voice connection is established by off-hook dialing and voice communication is subsequently switched to T.38 communication.

In the communication process of FIG. 6, when the telephone 111 is hooked up by the operator (answer to step S601 is YES) and then a destination telephone number is input by using ten keys or the like (answer to step S602 is YES), the flow proceeds to step S603. It should be noted that an off-hook button of the operation unit 118 can be pressed instead of hooking up the telephone 111 and that the destination telephone number can be input by using abbreviated dialing or by selecting it from the destination table.

In step S603, the CPU 101 controls the communication apparatus 100 in such a manner that an INVITE request that includes information representing a media type (m) of voice (audio) is transmitted by SIP, whereby a call connection is established by the SIP between the communication apparatus 100 and the receiver side, and voice telephone communication can be made possible. Step S603 is an example of a voice communication unit of this invention that performs voice communication with a communication destination.

Subsequently, when a transmission original is set on the sheet scanner 116 or on the book scanner 117 and a start key of the operation unit 118 is pressed by the operator (i.e., if YES to step S604), the CPU 101 determines whether the destination telephone number input in step S602 coincides with any of destination telephone numbers registered in the destination table, thereby determining whether the input destination telephone number is registered in the destination table. If it is determined that the input telephone number is registered in the destination table, the CPU 101 determines whether the communication mode registered in the destination table in correspondence to the registered telephone number is T.38 mode (step S605).

If the input destination telephone number is registered in the destination table and if the communication mode registered in the destination table in correspondence to the registered telephone number is T.38 mode (i.e., if YES to step S605), the flow proceeds to step S607.

On the other hand, if the input destination telephone number is not registered in the destination table or if the communication mode registered in the destination table in correspondence to the registered telephone number is not T.38 mode (i.e., if NO to step S605), the CPU 101 determines whether history information representing that communication mode is T.38 mode and a communication result is OK is present in the communication history table (step S606). If the answer to step S606 is YES, the flow proceeds to step S607. If the answer to step S606 is NO, the flow proceeds to step S609.

In step S607, the CPU 101 controls the communication apparatus 100 to execute reconnection, while specifying a media type (m) of image or application. After the reconnection is established, the CPU 101 controls the communication apparatus 100 to execute facsimile transmission in T.38 mode (step S608). Step S608 is an example of a transmission unit of this invention that executes facsimile communication in real-time Internet mode such as T.38 mode to transmit image data when voice communication is switched to facsimile communication, if it is determined based on the destination information that the destination of the voice communication which is being performed is capable of performing facsimile communication in real-time Internet mode such as T.38 mode.

In step S609, the CPU 101 controls the communication apparatus 100 to perform facsimile communication in virtual voice communication mode, while maintaining the voice connection. Thus, facsimile transmission is performed in the virtual voice mode, if the communication destination with which the voice communication is being performed is not registered in the destination information or if the communication destination with which the voice communication is being performed is not capable of performing facsimile communication in the T.38 mode.

In step S610, the CPU 101 controls the communication apparatus 100 to disconnect the connection and completes the present process.

According to the communication process of FIG. 6, facsimile transmission is executed in the T.38 mode when voice communication is switched to facsimile transmission, if a communication destination with which the voice communication is being performed is capable of performing facsimile communication in the T.38 mode. As a result, the voice communication can be switched to facsimile communication of T.38 mode which is higher in communication speed than the virtual voice mode.

In a case that manual transmission is performed in a communication terminal that has an IP telephone function, a virtual voice communication function, and a T.38 communication function, it is possible to execute facsimile transmission at high speed in the T.38 mode to the destination, thereby achieving an effect that communication costs can be reduced.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-182652, filed Aug. 24, 2011, which is hereby incorporated by reference herein in its entirety.

What is claimed is:

1. A communication apparatus capable of performing first facsimile communication using a real-time Internet mode in which image data is transferred through IP packets and second facsimile communication using a VoIP-based virtual voice mode, comprising:
    a storage unit configured to store at least one piece of destination information each representing whether a corresponding one of at least one pre-registered communication destination is capable of performing the first facsimile communication;
    a voice communication unit configured to perform VoIP-based voice communication with a communication destination by establishing a call connection; and
    a transmission unit configured, in a case where the voice communication is switched to facsimile communication while the call connection is being established, to perform the first facsimile communication to transmit image data, if it is determined based on the at least one piece of the destination information stored in said storage unit that a destination of the voice communication is capable of performing the first facsimile communication.

2. The communication apparatus according to claim 1, wherein the first facsimile communication is facsimile communication according to ITU-T recommendation T.38.

3. The communication apparatus according to claim 1, wherein each of the at least one piece of destination information includes history information that represents a communication mode used in past for execution of facsimile communication to a corresponding one of the at least one pre-registered communication destination, and
    said transmission unit performs the first facsimile communication in a case where the communication mode represented by the history information corresponding to the destination of the voice communication which is being performed indicates the first facsimile communication.

4. The communication apparatus according to claim 1, wherein said transmission unit performs the second facsimile transmission in a case where the destination of the voice communication which is being performed is not registered in the at least one piece of destination information.

5. The communication apparatus according to claim 1, wherein said transmission unit performs the second facsimile transmission in a case where the destination of the voice communication which is being performed is incapable of performing the first facsimile communication.

6. The communication apparatus according to claim 1, further comprising:
    a selection unit configured to select a media type of audio when the voice communication or the second facsimile communication is started and to select a media type of image when the first facsimile communication is started.

7. The communication apparatus according to claim 1, wherein the voice communication is switched to the facsimile communication by a predetermined user operation.

8. A control method for a communication apparatus that is capable of performing first facsimile communication using a real-time Internet mode in which image data is transferred through IP packets and second facsimile communication using a VoIP-based virtual voice mode and that includes a storage unit configured to store at least one piece of destination information each representing whether a corresponding one of at least one pre-registered communication destination is capable of performing the first facsimile communication, comprising:

performing VoIP-based voice communication with a communication destination by establishing a call connection; and performing, in a case where the voice communication is switched to facsimile transmission while the call connection is being established, the first facsimile communication, if it is determined based on the at least one piece of the destination information stored in the storage unit that a destination of the voice communication is capable of performing the first facsimile communication.

9. A non-transitory computer-readable storage medium storing a program for causing a computer to execute a control method for a communication apparatus that is capable of performing first facsimile communication using a real-time Internet mode in which image data is transferred through IP packets and second facsimile communication using a VoIP-based virtual voice mode and that includes a storage unit configured to store at least one piece of destination information each representing whether a corresponding one of at least one pre-registered communication destination is capable of performing the first facsimile communication, comprising:

performing VoIP-based voice communication with a communication destination by establishing a call connection; and performing, in a case where the voice communication is switched to facsimile transmission while the call connection is being established, the first facsimile communication, if it is determined based on the at least one piece of the destination information stored in the storage unit that a destination of the voice communication is capable of performing the first facsimile communication.

* * * * *